United States Patent [19]

Vale

[11] 4,013,440
[45] Mar. 22, 1977

[54] NITROGENOUS FERTILIZERS

[75] Inventor: William Henry Vale, East Brighton, Australia

[73] Assignee: Scientific and Applied Processes Pty., Ltd., Norwell, Australia

[22] Filed: Feb. 24, 1975

[21] Appl. No.: 552,310

Related U.S. Application Data

[63] Continuation-in-part of Ser. No. 370,983, June 18, 1973, abandoned.

[52] U.S. Cl. .................................. 71/24; 71/28; 260/515 H
[51] Int. Cl.$^2$ .................. C05F 11/02; C05C 9/00
[58] Field of Search .............. 71/24, 28, 30, 39 HZ; 260/515 H; 423/460, 461; 23/309 A, 312 A

[56] References Cited

UNITED STATES PATENTS

| | | | |
|---|---|---|---|
| 2,992,093 | 7/1961 | Burdick | 71/24 |
| 3,398,186 | 8/1968 | Schwartz | 71/24 X |

FOREIGN PATENTS OR APPLICATIONS

| | | | |
|---|---|---|---|
| 1,058,763 | 7/1963 | United Kingdom | 260/515 H |

Primary Examiner—Frank A. Spear, Jr.
Assistant Examiner—Ferris H. Lander
Attorney, Agent, or Firm—Christie, Parker & Hale

[57] ABSTRACT

This invention relates to nitrogenous compositions suitable for use as both fertilizers and soil conditioners, and in particular relates to processes for preparing the same from coals of low rank. The process dissolves humus from the coal with an aqueous urea solution that is then oxidized and neutralized with alkali to form a composition providing slow release of nitrogen when used as a fertilizer.

17 Claims, No Drawings

NITROGENOUS FERTILIZERS

BACKGROUND

This is a continuation-in-part of my copending application Ser. No. 370,983, filed June 18, 1973, now abandoned.

In general, low rank coals such as lignite are known to enhance the desired formation of crumb structure of soil particles and to impart porosity, aeration and water-absorption. However, these coals may be so acidic that they can hardly be applied as they are without having detrimental effects upon plant life. Treatment of the coals is therefore necessary to render them satisfactory for purposes of addition to soil.

One classical method, for obtaining humates or humic acid, involves treating coal with an aqueous sodium hydroxide extractant. Humates are dissolved in the extracting solution and separated from insoluble tailings. The extractant may then be acidified and humic acid precipitated. U.S. Pat. No. 2,992,093 to E. M. Burdick discloses one such treatment.

The aqueous caustic extraction system, though effective, has been found to be objectionable because of the low concentrations of humic acid which are dissolved in the aqueous caustic extraction liquor. The maximum amount of humic acid which can be dissolved in the extraction liquor is about 8% by weight, and this occurs only in strongly caustic solutions. In practice, because of the low concentration of humic acid salts in the extracting solution, large quantities of sodium hydroxide and water are necessary to recover humic acid in commerical operations.

In an effort to obtain more efficient recovery of the humic acid, other extraction systems have been attempted, such as flotation processes using a non-polar medium such as carbon tetrachloride, and organic solvent extraction systems using acetone and water extracting mediums. While these processes are effective, they are expensive to operate and require complicated purification techniques.

Humic acid itself contains carbon, hydrogen and oxygen atoms only, and finds use as a soil conditioner but not as a fertilizer because of the absence of any essential plant nutrients such as nitrogen, potassium or phosphorus. In preparing the humates, however, if ammonium hydroxide or potassium hydroxide are used as the extractant in place of sodium hydroxide, nitrogen or potassium becomes available for supply to plants. Here again, though, ammonium or potassium hydroxide are not particularly good extractants, being no better than sodium hydroxide in quantity of humus dissolved, which in turn means that little nitrogen or potassium is available for plant supply. Moreover, at least in the case of nitrogen, this is present predominantly in a form which is released at a fairly rapid rate. The nitrogen bearing components of the composition are rather easily dissolved in water. Ammonium humates are thus not suitable where the aim is to provide a fertilizer which will permit the slow release of nitrogen.

Coals have also been subjected to treatment with nitric acid, this giving rise to a compound commonly referred to as nitro humic acid. As with the aqueous caustic extractant, nitric acid is not a particularly effective extractant unless high concentrations of nitric acid and high extraction temperatures are employed, and even then the maximum amount of humic acid extracted is not very high. Nitro humic acid contains little nitrogen — generally little more than about 2% by weight, based on the overall weight of the acid — and the bulk of whatever nitrogen is available is water-soluble and in quick-release form.

In an endeavour to improve the fertilizer characteristics of nitro humic acid, the acid has been treated with such compounds as gaseous ammonia or urea. There is, however, no chemical reaction between the acid and the additive, and the resultant product is merely a physical admixture of the two components. The additive serves to boost the overall nitrogen content, but yet again most of the nitrogen is in a water-soluble form available for quick release. In the case of the addition of urea, this additive suffers the same failures as soluble nitrates, that is to say, it is too easily washed out of soil.

In contrast to the above extraction techniques — alkaline, organic and acidic — and their attendant disadvantages, it has now been found that coals of low rank may be extracted with an aqueous urea solution, which is substantially neutral, with surprisingly good results.

BRIEF SUMMARY OF THE INVENTION

More particularly, one aspect of the present invention provides a process for preparation of a nitrogeneous composition suitable for use as a fertilizer and a soil conditioner and having a substantial nitrogen content of which a significant amount is in insoluble, slow-release form, comprising the steps of:

dissolving a substantial amount of the humus content of a coal of low rank with an aqueous urea solution;

subjecting the solution thus formed to oxidizing conditions;

introducing an alkali into the solution; and removing water from the oxidized solution to form the nitrogenous composition.

Another aspect of the invention providing a process for the preparation of a nitrogeneous compound suitable for use as a fertilizer and a soil conditioner comprising the steps of:

treating a coal of low rank with an aqueous urea solution at about room temperature to dissolve at least a substantial amount of the humus content of the coal, at least a part of the aqueous urea solution being formed in situ by virtue of the initial moisture content of the coal;

subjecting the solution thus formed to oxidizing conditions;

introducing an alkali into the solution; and removing the water from the oxidized solution to form the nitrogenous compound.

It is of importance to note that in the dissolution of the humus content of the coal in the aqueous urea solution there is no reaction of the urea and humus to form a soluble salt. The aqueous urea solution acts in the capacity of an extractant rather than reactant and in so doing renders the humus more amenable to oxidation. Furthermore, the extract is acidic, the degree of acidity depending upon the initial pH of the coal to be treated.

DESCRIPTION

As the rank of coal goes down so does the water content go up, and with coals of low rank the water content is generally within the range of 50% to 80% by weight, based on the total weight of coal. Thus, aqueous urea solution may be formed in situ by the mixing of the low rank coal with dry urea. In some instances, where the water content of the low rank coal is low, say of the order of 50 to 55% by weight, it may be desirable to add water to the coal and urea to boost the water content to about 60% by weight and so effect maximum dissolution.

The insoluble fraction of the coal is not generally separated from the soluble fraction, though it may be. Where there is no separation, the insoluble fraction is carried through to the end product and, as far as can be established, has no adverse affects on that product.

The actual amount of coal employed in the process will be dependent upon the type of coal, since the proportion of humus present varies from coal to coal. This amount can be readily determined by simple experiment. A preferred range, however, is 60% to 80% by weight, based on the overall weight of reactants.

By this process it is possible to provide a fertilizer exhibiting the following properties:
1. It permits a slow release of combined nitrogen, thus avoiding the high initial yield and following rapid fall-off in efficiency, characteristic of chemical fertilizers such as ammonium sulphate and prior humus extracts.
2. It permits a retention of essential plant nutrients, such as phosphorus and iron, in an easily available form.
3. It improves the water retention and heat absorbing capacity of the soil.
4. It constitutes a buffer which prevents rapid changes in the acidity or alkalinity of soils.

Though any coal of low rank may be used, brown coal is preferred, usually in amounts of from 60% to 80% by weight, based on the overall weight of reactants. The amounts of coal may, of course, vary considerably, even outside of this range, and will depend on the amounts of the other reactants used. These latter amounts are set out hereinafter. Certain peats or peat coals may also be put to good use.

The coal should be in particulate form to facilitate dissolution in the aqueous urea solution, and as might be expected the smaller the average particle size the less the time required for effecting dissolution.

The treatment is preferably carried out at room temperature for the simple reason that elevated temperatures are only marginally better in terms of overall efficiency.

The urea is preferably present in an amount greater than about 15% by weight based on the overall weight of the coal, added water (if any) and urea. Extraction is to a degree proportionately related to the amount of urea and the relative amounts of urea and water present, and in some instances amounts of urea less than 15% by weight may give rise to an inferior end product because of incomplete dissolution. Preferably, the amount of urea is less than about 30% by weight since higher amounts increase cost without enhancing extraction efficiency and may result in the presence of some unreacted urea in the final product. It is found that urea is most preferably present in amounts of from about 18 to 22% by weight. This range appears to give optimum extraction, bearing in mind cost and efficiency factors.

Oxidation may be carried out by means of conventional oxidants, although generally speaking solid and liquid oxidants are preferred to gaseous oxidants because of ease of handling. By way of example, there is mentioned urea peroxide, sodium peroxide, nitric acid and hydrogen peroxide. Needless to say, the oxidant should not be one having one or more elements which are toxic to basic plant life. Nitric acid, particularly concentrated commercial nitric acid, and hydrogen peroxide are most preferred.

The amounts of nitric acid preferably range from about 1.5 to 5% by weight, based on the overall weight of reactants. Oxidation with proceed will amounts below about 1.5% by weight, but it may with some coals be incomplete so that not all of the humus content is utilized in the process. There is little advantage in using more than about 5% by weight of nitric acid when increased efficiency is balanced against increased material costs. A range of 1.7 to 3% by weight is generally quite satisfactory.

The amounts of hydrogen peroxide preferably range from about 0.5 to 3.0% by weight, based on the overall weight of reactants, the upper and lower limits being determined by the same factors as mentioned above in relation to nitric acid. Generally, up to 2% by weight will suffice.

Oxidation establishes functional groups such as phenolic, carbonyl and carboxylic groups on the humic acid molecules, which are capable of readily combining simultaneously with the NH groups which are a product of the oxidation of the urea, and the ammonia, if present, to form a gel. On drying to an effectively dry granular consistency suitable for packaging and shipping, the gel is found to be slowly peptised in water.

The alkali is preferably selected from the group consisting of sodium hydroxide, potassium hydroxide and ammonia, and is introduced after the dissolving step and either before or after the step of subjecting the solution to oxidizing conditions. The amount of alkali will be largely dictated by the amount of oxidant, but usually the alkali is added in an amount ranging from 0.4 to 1% by weight when either sodium hydroxide or potassium hydroxide, and from 5 to 7% by weight when ammonia. With ammonia there is the additional benefit of a compound which is able to confer further nitrogen to the end product. In some instances, ammonia and either of the alkali metal hydroxides may be added.

The amount of total nitrogen and fixed nitrogen in the end product is a function of the nature of the coal used as the starting material and the amount of functional groups provided by that coal. Where ammonia is used, however, the final product will usually contain from about 15 to 25% by weight of nitrogen of which about 4 to 6% is essentially water insoluble and available for slow release. Where ammonia is not used, the final product may still contain upwards of about 10% by weight of nitrogen, 4 to 6% being essentially water insoluble and available for slow release. When the oxidant is nitric acid, the alkali preferably is added after the oxidant, whereas the reverse is the case where hydrogen peroxide is employed as the oxidant.

The invention will now be further illustrated by reference to the following examples.

EXAMPLE I

A 30 lb. sample of brown coal from the Morwell-Yallourn area of Victoria, Australia, in finely-divided form, was mixed with 9 lb. of dry urea powder in a mill. No additional water was necessary. Following dissolution, 12 oz. of concentrated commercial nitric acid was added to the mixture followed by 3 oz. of sodium hydroxide dissolved in a small amount of water. 3 lb. of aqueous ammonia solution (s.g. 0.880) was then introduced into the mixture and the resulting gel dried to a granular consistency. There was no separation of the soluble and insoluble fractions following dissolution. The gel and dried product analysed as follows:

Gel 52.7% moisture
47.3% total solids
11.58% total nitrogen
9.0 pH

Dried Product (subjected to washing)

4.1% fixed nitrogen (residue)
13.26% soluble nitrogen (filtrate)

A second 30 lb. sample from the same area was treated in the same manner and the gel and dried product analysed as follows:

Gel 50.5% moisture
49.5% total solids
15.38% total nitrogen
9.21 pH

Dried Product 4.46% fixed nitrogen
12.51% soluble nitrogen

EXAMPLE II

Example I was repeated, except that no aqueous ammonia solution was introduced at the end. The gel and dried product analysed as follows:

Gel 49.1% moisture
50.9% total solids
10.91% total nitrogen
6.92 pH

Dried Product 4.3% fixed nitrogen
11.09% soluble nitrogen

EXAMPLE III 10 lb. of brown coal from the Morwell-Yallourn area of Victoria, Australia, in finely-divided particulate form, was mixed with 3 lb. of dry urea powder in a mill. No additional water was necessary. Following dissolution, 1 oz. of sodium hydroxide dissolved in a small amount of water was added to the mixture followed by 4 oz. of $H_2O_2$ (100) Vol. 1 lb. of aqueous ammonia solution (s.g. 0.880) was then introduced into the mixture and the resulting gel dried to a granular consistency. There was no separation of the soluble and insoluble fractions following dissolution. The gel and the dried product analysed as follows:

Gel 49.8% moisture
50.2% total solids
11.38% total nitrogen
9.01 pH

Dried Product 3.95 fixed nitrogen
12.05 soluble nitrogen

EXAMPLE IV

Example III was repeated, except that no ammonia was introduced at the end. Analyses of the resulting gel and dried product were similar to those above.

The products of Examples I to IV were shown to exhibit all the abovementioned four properties, as well as being chemically stable in the dry state, thereby permitting normal packaging for transport purposes.

I claim:

1. A process for the preparation of a nitrogeneous composition suitable for use as a fertilizer and a soil conditioner and having a substantial nitrogen content of which is significant amount is in insoluble, slow-release form, comprising the steps of:
   treating a coal of low rank with an aqueous urea solution;
   subjecting at least a portion of the composition thus formed to oxidizing conditions;
   introducing an alkali into at least a portion of the composition; and
   removing water from the oxidized composition to form the nitrogeneous composition.

2. A process according to claim 1, wherein the urea is present in an amount of form 18 to 22% by weight, based on the weight of the coal, water and urea.

3. A process according to claim 1, wherein at least a portion of the composition is oxidized by means of an oxidizing agent selected from the group consisting of nitric acid and hydrogen peroxide.

4. A process according to claim 3, wherein the oxidizing agent is nitric acid, and the alkali is added after the oxidizing agent.

5. A process according to claim 3, wherein the oxidizing agent is hydrogen peroxide, and the alkali is added before the oxidizing agent.

6. A process according to claim 1, wherein the alkali is selected from the group consisting of sodium hydroxide, potassium hydroxide and ammonia introduced after the treating step and either before or after the step of subjecting the composition to oxidizing conditions.

7. A process for the preparation of a nitrogeneous composition suitable for use as a fertilizer and a soil conditioner comprising the steps of:
   treating a coal of low rank with an aqueous urea solution at about room temperature, at least a part of the aqueous urea solution being formed in situ by virtue of the initial moisture content of the coal;
   subjecting the composition thus formed to oxidizing conditions;
   introducing an alkali into the composition; and
   removing water from the oxidizing composition to form the nitrogeneous composition.

8. A process according to claim 7, wherein the urea is present in an amount of from 18 to 22% by weight, based on the weight of the coal, water and urea.

9. A process according to claim 7, wherein the composition is oxidized by means of an oxidizing agent selected from the group consisting of nitric acid and hydrogen peroxide.

10. A process according to claim 9, wherein the oxidizing agent is nitric acid, and the alkali is added after the oxidizing agent.

11. A process according to claim 9, wherein the oxidizing agent is hydrogen peroxide, and the alkali is added before the oxidizing agent.

12. A process according to claim 7, wherein the alkali is selected from the group consisting of sodium hydroxide, potassium hydroxide and ammonia introduced after the treating step and either before or after the step of subjecting the composition to oxidizing conditions.

13. A process for preparation of a nitrogenous composition suitable for use as a soil conditioner and slow release fertilizer containing about 4% or more of essentially water insoluble nitrogen compounds comprising the steps of:
contacting a coal of low rank containing about 50% or more water with urea whereby an aqueous composition containing urea and humus is formed;
subjecting the composition to oxidizing conditions;
introducing alkali into the composition; and
removing water from the composition to form an effectively dry nitrogenous fertilizer composition.

14. A process according to claim 13, further comprising the step of adding water to the coal and urea, when the coal contains no more than about 55% water, to bring the total water to at least about 60%.

15. A process according to claim 1 wherein the composition is oxidized by means of from about 1.5 to about 5% by weight of nitric acid based on the weight of the reactants.

16. A process according to claim 1 wherein the composition is oxidized by means of from about 0.5 to about 3% by weight of hydrogen peroxide based on the weight of the reactants.

17. A process for the preparation of nitrogenous composition suitable for use as a fertilizer and soil conditioner comprising the steps of:
treating a coal of low rank with an aqueous urea solution, to dissolve at least a substantial amount of the humus content of the coal, the amount of urea present being from 18 to 22% by weight based on the weight of coal, waer and urea;
subjecting the solution thus formed to oxidation with an oxidizing agent selected from the group consisting of nitric acid, in an amount of from 1.5 to 5.0% by weight, based on the overall weight of reactants, and hydrogen peroxide, in an amount of from 1.7 to 3% by weight based on the overall weight of the reactants;
introducing into the solution an alkali selected from the group consisting of sodium hydroxide, and potassium hydroxide in an amount ranging from 0.4% to 1% by weight, based on the total weight of reactants, and ammoniun hydroxide, in an amount from 5 to 7% by weight, based on the total weight of reactants; and
removing water from the oxidized solution to form a nitrogenous composition containing from about 10 to 25% by weight of nitrogen of which at least about 4% to 6% by weight is in insoluble and slow-release form.

* * * * *